United States Patent Office 3,842,113
Patented Oct. 15, 1974

3,842,113
CATALYST FOR REDUCING CARBON DIOXIDE
Masaru Ichikawa, Tokorozawa, Shuichi Naito, Toshihiko Kondo, and Kohei Kawase, Sagamihara, and Kenzi Tamaru, Kamakura, Japan, assignors to Sagami Chemical Research Center, Tokyo, Japan
No Drawing. Original application Sept. 30, 1971, Ser. No. 185,370, now abandoned. Divided and this application Feb. 15, 1973, Ser. No. 332,575
Claims priority, application Japan, Nov. 25, 1970, 45/103,263
Int. Cl. C07c 1/12, 27/06
U.S. Cl. 260—449 R                                    7 Claims

ABSTRACT OF THE DISCLOSURE

Catalyst capable of converting carbon dioxide into hydrocarbons and oxygen-containing hydrocarbons is disclosed said catalyst comprises at least one alkali metal belonging to Group Ia of the Periodic Table, graphite and at least one halide of a transition metal selected from the group consisting of Groups VIB and VIII of the Periodic Table.

---

This is a division of application Ser. No. 185,370, filed Sept. 30, 1971 and now abandoned.

This invention relates to a catalyst for reducing carbon dioxide. More particularly it relates to a catalyst capable of converting a mixture of hydrogen and carbon dioxide into various hydrocarbons and oxygen-containing hydrocarbons. Said catalyst comprises at least one alkali metal, graphite and at least one halide of a transition metal selected from the group consisting of Groups VIB and VIII of the Periodic Table.

Because the increased accumulation of carbon dioxide, in the atmosphere caused by huge consumption of carbonaceous materials, especially organic materials, has become a serious problem from the view point of public nuisance, there is now strong public demand to convert carbon dioxide to a form capable of being effectively recovered as a useful material.

Hereinbefore, there was no catalyst capable of directly reducing carbon dioxide into a hydrocarbon. One possible process was to reduce carbon dioxide with hydrogen over a water-gas forming catalyst to convert it into carbon monoxide which was then contacted with Fisher-Tropsch catalyst to obtain a liquid hydrocarbon. However, this process involves inherent disadvantage in that the life of the catalyst is extremely short and the process is to be carried out in two-steps.

The catalyst according to this invention is novel and its constituents are entirely different from those of the prior art. By the use of the catalyst according to this invention, it is possible to carry out the reduction of carbondioxide at a normal temperature and pressure, and to obtain various hydrocarbons and oxygen-containing hydrocarbons among which $C_2$ components, such as ethylene and ethane, are produced with a high selectivity. The catalyst is not adversely affected by the oxygen and sulfur compounds in the synthesis gas.

The catalyst according to this invention is a complex comprising (a) at least one alkali metal belonging to Group IA of the Periodic Table, (b) at least one halide of transition metal selected from the group consisting of Groups VIB and VIII of the Periodic Table and (c) graphite. The preferred transition metal halide is chloride.

This complex comprises an alkali metal as an electron donor, graphite as an electron acceptor and a transition metal halide in an appropriate amount. Thus, such complex is generally called as "an electron donor-acceptor complex."

The catalyst according to this invention can be produced by means of (1) subjecting a mixture of graphite and a transition metal halide to a heat treatment at a temperature of from about 250 to 500° C. for about 5 to 20 hours to form a graphite-transition metal halide interlayer complex, (2) adding an alkali metal to the complex and thereafter (3) heating the mixture under a reduced pressure, for example less than $10^{-1}$ cm. Hg, preferably less than $10^{-3}$ cm. Hg or in an inert gas atmosphere, such as argon and nitrogen, at a temperature above the melting point of the alkali metal. In the catalyst, the weight ratio of the transition metal halide to graphite is generally about 0.001–10:1, preferably 0.01–1.0:1, and the weight ratio of alkali metal to graphite-transition metal halide interlayer complex is generally about 0.1–10:1 and preferably 0.5–1.0:1. The graphite employed for preparation of the catalyst can be produced by pyrolysis of a carbon-containing material, such as coal pitch coke and petroleum pitch coke, a gaseous hydrocarbon such as methane and ethane, and carbon. The preferred graphite is produced by pyrolysis of active carbon.

The catalyst according to this invention shows a remarkable absorption of hydrogen and carbon dioxide; hence when a mixture of these gases is contacted with the catalyst, there is observed the formation of $C_1$–$C_5$ hydrocarbons and oxygen-containing hydrocarbons, especially $C_2$ hydrocarbons, such as ethylene and ethane with high selectivity.

If any one or two of (a) an alkali metal, (b) a transition metal halide and (c) graphite are employed individually or in combination as catalyst, the formation of hydrocarbon is extremely low. In contrast, the three-component catalyst of this invention is able to increase the formation of hydrocarbon by ten times and the kind and proportion of hydrocarbons produced may vary depending upon the kind of transition metal employed as catalyst ingredient.

The reduction of carbon dioxide using the catalyst according to this invention is generally carried out at a temperature of from room temperature to 500° C., preferably 250° to 400° C., under a reduced to superatmospheric pressure and at a space velicity of 100–20000 v./v.-hr. through recirculating or passing-through system. The product is entrapped in suitable trapping means, such as a cooler or a condenser.

This invention will be further explained in detail by means of Examples; however it should be understood that the Examples are given only for the purpose of illustration and are not intended to limit the scope of this invention.

Example 1

In a 300 cc. glass U-shaped reactor, graphite and a chloride of a metal belonging to Groups VIB or VIII of the Periodic Table were heated at 300° C. under a reduced pressure of $10^{-3}$ mm. Hg to form graphite-transition metal halide interlayer complex.

Then metallic potassium was added to the complex and melted under the same conditions to form a three-component catalyst of graphite-transition metal halide-potassium. The surface area of the catalyst was measured according to the BET Method and found to be about 20 m.²/g.

A mixture of hydrogen and carbon dioxide was circulated in the reactor containing the catalyst at a rate of 15 cc./min.

The product hydrocarbon was subjected to quantitative and qualitative analysis of gas chromatography and infrared spectroscopy. The reaction conditions and the results are given in Table 1 which includes a two-component catalyst for comparison.

TABLE 1

| Catalyst | Partial pressure of gas (cm. Hg) CO₂ | H₂ | Amount of hydrocarbons recovered after 20 hrs. (cc.) | Proportion of hydrocarbons (molar percent) C₁ | C₂ | C₃ | C₄ | C₅ |
|---|---|---|---|---|---|---|---|---|
| G (2gr.), K (2gr.) | 30 | 30 | <0.1 | | | | | |
| MoCl₅ (0.6gr.), G (2gr.) | 30 | 30 | 0 | | | | | |
| WCl₆ (0.6gr.), G (2gr.), K (2gr.) | 24 | 36 | 5.7 | 2.6 | 92.5 | 4.7 | 2.0 | 0 |
|  | 30 | 30 | 7.0 | 6.8 | 87.3 | 6 |  |  |
| MoCl₅ (0.6gr.), G (2gr.), K (2gr.) | 31 | 34 | 4.1 | 5 | 90 | 4.8 | 0.2 | 0 |
| CoCl₂ (0.6gr.), G (2gr.), K (2gr.) | 30 | 30 | 3 | 5.2 | 88.3 | 3.5 | 0 | 0 |
| NiCl₂ (0.2gr.), G (2gr.), K (2gr.) | 15 | 45 | 22 | 13 | 81 | 5 | 1 | 0 |
|  | 30 | 30 | 25 | 10 | 85 | 4 | 1 | 0 |
| PdCl₂ (1.0gr.), G (2gr.), K (2gr.) | 15 | 45 | 6.3 | 7 | 90 | 2 | 1 | 0 |
|  | 30 | 30 | 5.7 | 6 | 91 | 2 | 1 | 0 |
| PtCl₄ (0.2gr.), G (2gr.), K (2gr.) | 15 | 45 | 11 | 7 | 91 | 1 | 1 | 0 |
|  | 30 | 30 | 12.2 | 9 | 88 | 2 | 1 | 0 |
| FeCl₃ (1.0gr.), G (2gr.), K (2gr.) | 15 | 45 | 6 | 6 | 88 | 3 | 1 | 0 |

NOTE.—G graphite.

Example 2

According to the procedures in Example 1, a three-component catalyst was prepared from graphite, a transition metal halide and an alkali metal. Carbon dioxide was reduced with hydrogen over the catalyst. The reaction conditions and results are given in Table 2.

TABLE 2

| Catalyst | Partial pressure of gas (cm. Hg) CO₂ | H₂ | Amount of hydrocarbons recovered after 20 hrs. (cc.) | Proportion of hydrocarbons (molar percent) C₁ | C₂ | C₃ | C₄ |
|---|---|---|---|---|---|---|---|
| MoCl₅(0.6gr.), G(2gr.), Na(2gr.) | 10 | 50 | 0.5 | 3 | *87 | 10 | 0 |
| MoCl₅(0.6gr.), G(2gr.), Rb(1gr.) | 10 | 45 | 2.8 | 7 | *90 | 3 | 0 |
| NiCl₂(0.5gr.), G(2gr.), Na(2gr.) | 15 | 45 | 4.7 | 0 | *93 | 6 | 2 |

*Molar ratio of ethylene to ethane being 92:1.

We claim:

1. In a process for reducing carbon dioxide wherein carbon dioxide is reacted with hydrogen in the presence of a catalyst, the improvement which comprises conducting said reaction at a temperature of from 250° C. to 400° C. in the presence of an electron donor-acceptor complex catalyst consisting essentially of
   (a) an alkali metal,
   (b) a chloride of a transition metal of Group VIB or VIII of the Periodic Table, and
   (c) graphite, and
wherein the weight ratio of said chloride to graphite is 0.001–10:1 and of said alkali metal to graphite and said chloride is 0.1–10:1.

2. The synthesis of Claim 1, wherein the weight ratio of said chloride to graphite is 0.01–1.0:1 and of said alkali metal to graphite and said chloride is 0.5–0:1.

3. The synthesis of Claim 1, wherein said alkali metal is sodium, potassium or rubidium.

4. The synthesis of Claim 1, wherein said complex is formed by
   heating a mixture of graphite and said chloride at a temperature of from 200 to 500° C. to form a graphite-chloride interlayer complex;
   adding said alkali metal to said interlayer complex, and heating the resulting mixture at a temperature above the melting point of said alkali metal under a reduced pressure of less than 10⁻³ cm. Hg.

5. The synthesis of Claim 1, wherein said reaction is conducted under a reduced pressure to a superatmospheric pressure.

6. The synthesis of Claim 1, wherein said reaction is conducted with a space velocity of 100–20,000 v./v.-hr.

7. The synthesis of Claim 1, wherein said complex is formed by
   heating a mixture of graphite and said chloride at a temperature of from 200 to 500° C. to form a graphite-chloride interlayer complex;
   adding said alkali metal to said interlayer complex, and heating the resulting mixture at a temperature above the melting point of said alkali metal in an inert gas atmosphere.

References Cited
UNITED STATES PATENTS

| | | | |
|---|---|---|---|
| 2,692,274 | 10/1954 | Kolbel et al. | 260—449.6 |
| 2,660,598 | 11/1953 | Hoffert | 260—449 |
| 1,909,442 | 5/1933 | Williams | 260—449 M |
| 2,564,696 | 8/1951 | Keith et al. | 260—449.6 |

HOWARD T. MARS, Primary Examiner

U.S. Cl. X.R.

260—449 M, 449.6 R; 252—441, 447, 474, 476